Figure 1:
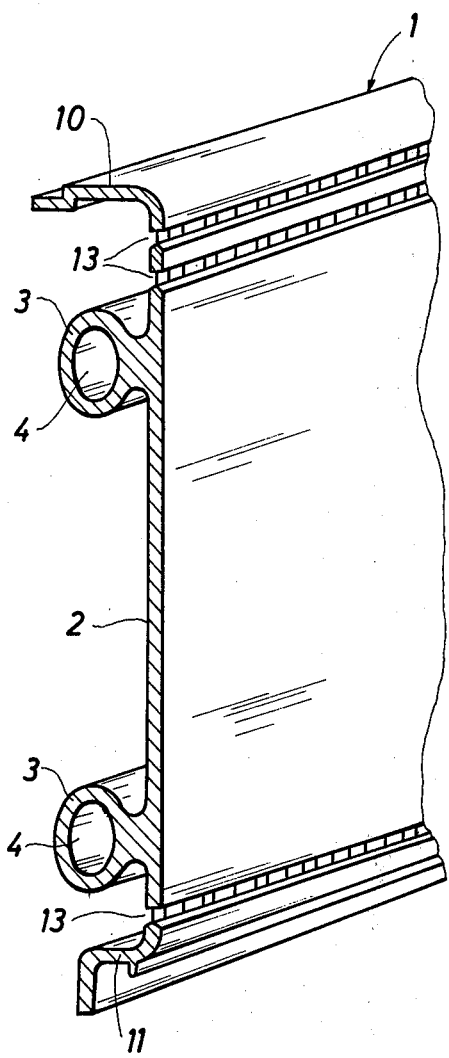

United States Patent [19]

Keldmann

[11] 4,216,823
[45] Aug. 12, 1980

[54] BASEBOARD HEATING APPARATUS WITH CABLE CARRIER

[75] Inventor: Erik C. V. Keldmann, Bellinge, Denmark

[73] Assignee: Elpan ApS, Denmark

[21] Appl. No.: 912,217

[22] Filed: Jun. 5, 1978

[51] Int. Cl.² .......................... F24H 9/08; H02G 3/22
[52] U.S. Cl. ..................................... 165/55; 165/129; 165/138; 174/48; 219/342; 219/345; 219/366; 219/377; 248/68 R; 248/233
[58] Field of Search ................. 174/48; 219/342, 345, 219/365, 366, 377; 165/49, 53, 55, 129, 138; 248/68 R, 232, 233

[56] References Cited

U.S. PATENT DOCUMENTS

| 3,062,945 | 11/1962 | Glynn | 219/345 |
|---|---|---|---|
| 3,162,243 | 12/1964 | Dziekonski | 165/55 |
| 3,310,652 | 3/1967 | Williams, Jr. | 219/366 |
| 3,408,480 | 10/1968 | Peltak et al. | 165/55 |
| 3,865,969 | 2/1975 | Mulvey | 174/48 |
| 4,037,900 | 7/1977 | Schmidger | 174/48 |

FOREIGN PATENT DOCUMENTS

| 1920756 | 11/1970 | Fed. Rep. of Germany | 174/48 |
|---|---|---|---|
| 2140242 | 2/1973 | Fed. Rep. of Germany | 165/129 |
| 1305181 | 4/1962 | France | 174/48 |
| 1501476 | 10/1967 | France | 174/48 |
| 286418 | 6/1931 | Italy | 219/366 |
| 655692 | 8/1951 | United Kingdom | 219/342 |

OTHER PUBLICATIONS

Base-Ray Heat Panel, Form 852, Burnham Boiler Corporation, Irvington, New York.

Primary Examiner—Sheldon Richter
Attorney, Agent, or Firm—Holman & Stern

[57] ABSTRACT

The invention provides a heat apparatus for heating rooms in buildings and acting as baseboard in the rooms, where the heat is transmitted from a gaseous or liquid heating medium, such as steam or hot water, which passes channels in the housing of the apparatus. The housing comprises a housing portion which is a profile rail of metal, preferably a metal alloy with great heat conductivity, such as an aluminium alloy, and the profile rail is formed with integral, longitudinally extending, inner beads having hollow spaces for the heating medium, whereby the housing portion containing the heating medium channels can be manufactured in one operation by extrusion.

4 Claims, 6 Drawing Figures

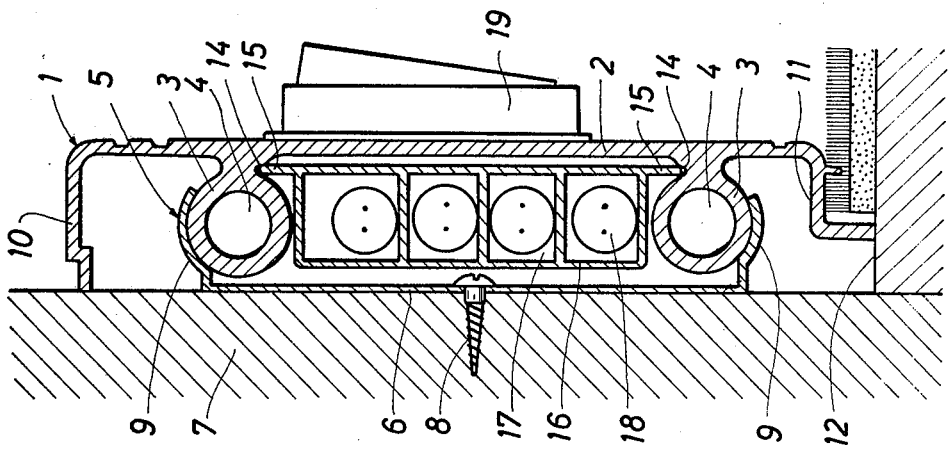
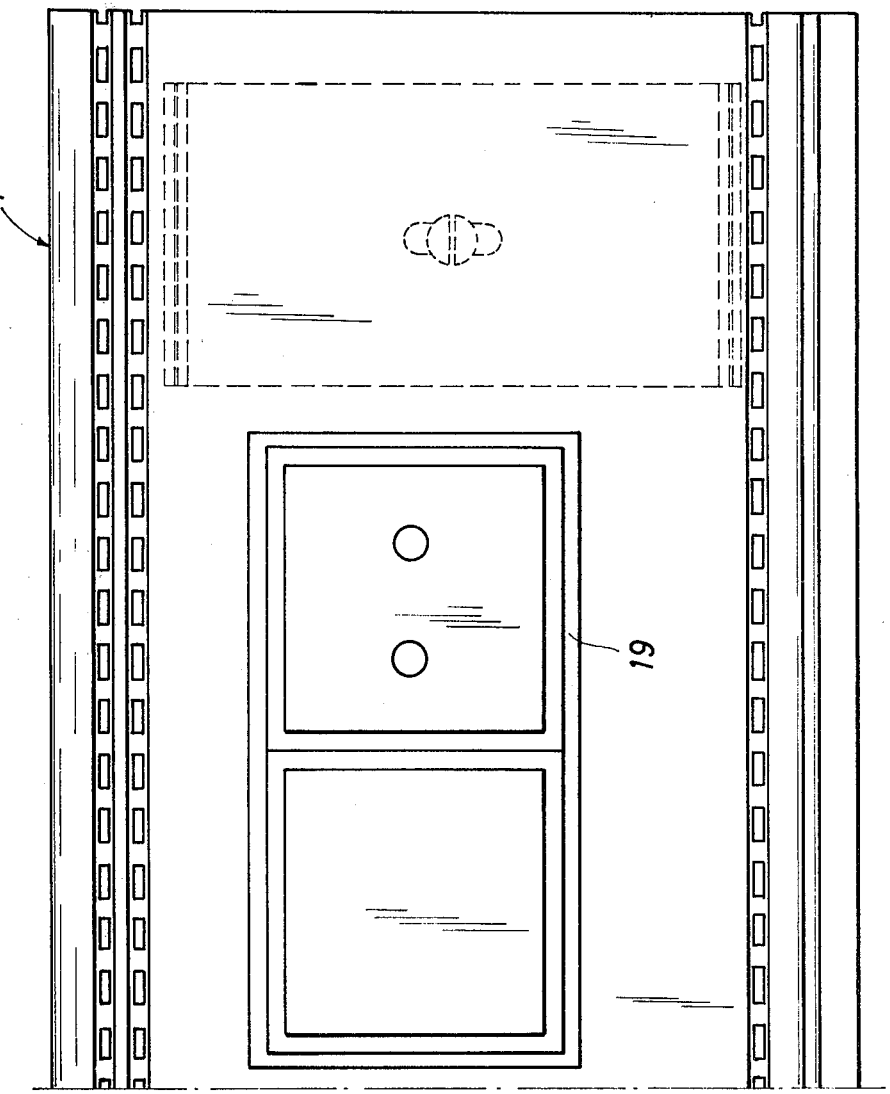

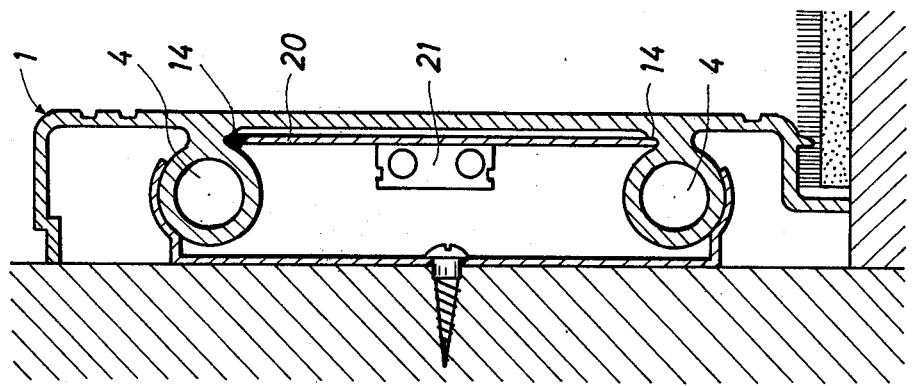
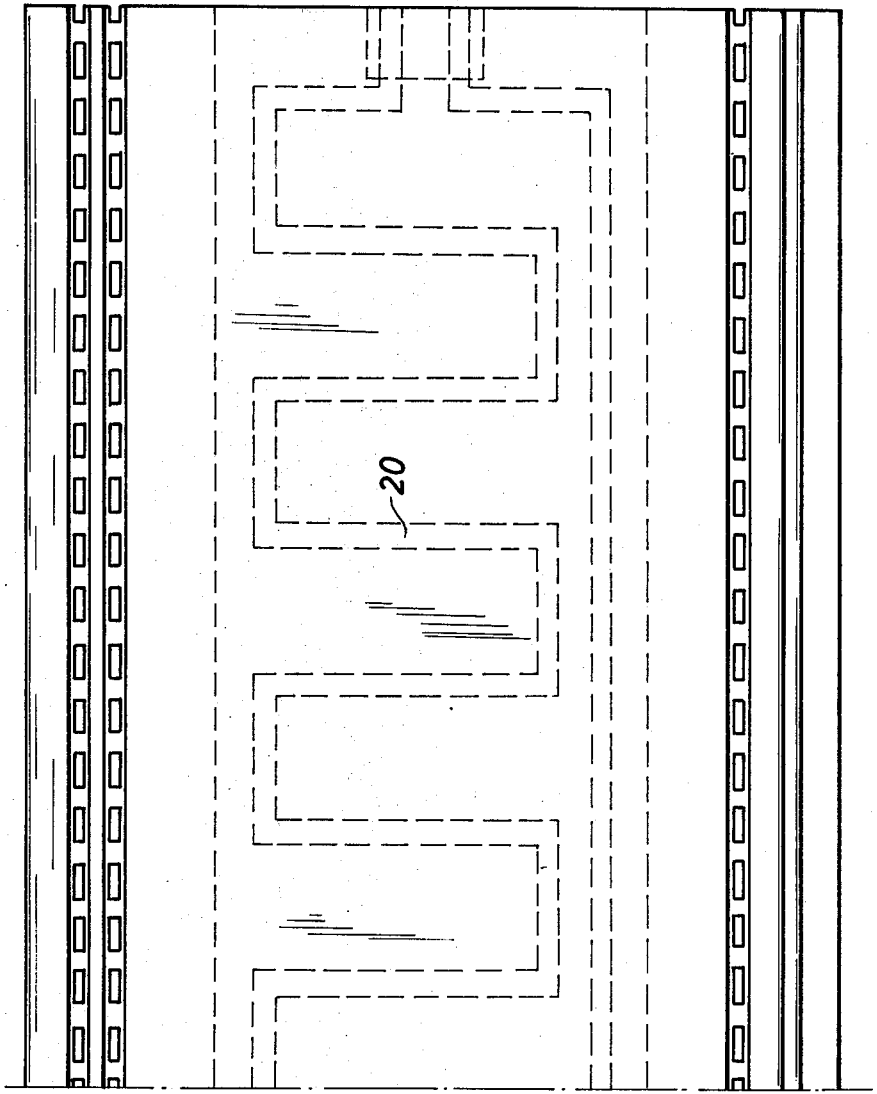

BASEBOARD HEATING APPARATUS WITH CABLE CARRIER

The invention relates to a heating apparatus of the type which is adapted to be mounted as baseboard along the walls of the room which is to be heated, said apparatus having a housing containing channels for a gaseous or liquid heating medium.

In known apparatuses of this type the channels for the heating medium are tubes which may be mounted to a housing portion by suitable mounting means. The heating medium tubes may also be mounted on the walls of the room which is to be heated or on a carrying member which is mounted on said wall, and another housing portion may constitute a screen for the tubes.

The heating apparatus according to this invention is characterised in that the apparatus comprises a housing portion consisting of a metal profile rail having a body plate which is vertical in use, said rail being formed with upper and lower integral, inwardly facing, longitudinally extending beads having hollow spaces which constitute supply and return channels for the gaseous or liquid medium.

By this construction of the apparatus advantages are obtained during the manufacture and use thereof. The said housing portion may be manufactured in a continuous process, preferably by extrusion of a metal alloy, for instance an aluminium alloy, which is well adapted to be deformed to the desired profile, and which has great heat-conducting characteristics. By the said process of manufacture and by elimination of the mounting means and mounting work for the heating tubes a significant reduction of the manufacturing costs is obtained.

As the walls in the channels which contain the heating medium are integral with the housing portion a great heat transmission is obtained from the heating medium to the body plate and from there to the room which is to be heated, so that high efficiency is obtained.

According to an embodiment of the invention the said housing portion may be formed with carrying means adapted to engage and carry an electric heating element or a carrying member for the latter.

Thereby the advantage is obtained that without any difficulties and greater costs an electric heating element can be mounted in a heating apparatus which is adapted to use a gaseous or liquid heating medium, so that the effect of the baseboard heating apparatus can be increased in desired areas, as for instance under a window, and it may be advantageous during certain seasons to use electric heating alone during certain periods of the day and night.

According to a special embodiment of the invention the said housing portion may be formed to engage and carry a carrying member for electric cables and further be formed with means for mounting one or more sockets for connecting the cables with a plug for a wire from a consumption unit.

By this embodiment the heating apparatus may without special costs be adapted to constitute a screen for cables for electric heavy or low current for domestic apparatuses, such as lamps and television sets.

Figure 2:
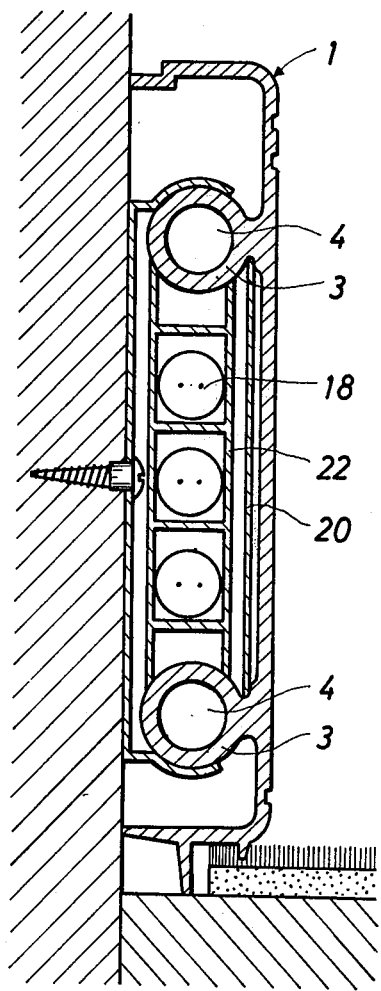

The invention will now be described in greater detail with reference to the accompanying drawings, in which FIG. 1 shows a part of a housing portion in isometric view and in section, FIG. 2 shows a section through an embodiment of a heating apparatus according to the invention mounted on a room wall, FIG. 3 shows a modified embodiment of a heating apparatus according to the invention in side view, FIG. 4 shows a cross-section through the heating apparatus according to FIG. 3 mounted on a room wall, FIG. 5 shows the same as FIG. 3 for a further modification, and FIG. 6 shows a cross-section through the apparatus according to FIG. 5 mounted on a room wall.

The heating apparatus according to the invention comprises, as seen in FIG. 4, a housing portion 1 which is manufactured as an integral unit, preferably by extrusion, of a suitable metal alloy. The housing portion 1 has a vertical body plate 2 formed with two longitudinally extending beads 3 having hollow spaces 4 which constitute longitudinal channels.

The housing portion 1 is carried by another housing portion 5 which has a vertical body plate 6 mounted on a room wall 7 by means of screws 8, the portion 5 having arched flanges 9 adapted to engage the outer arched surfaces of the beads 3 by snap action.

The housing portion 1 has further an upper flange 10 extending towards the room wall 7 and a lower flange 11 which has an angular cross-section and abuts the floor 12 in the room which is to be heated.

FIG. 1 shows the housing portion 1 partly in isometric view and partly in cross-section. During the extrusion of the housing portion 1 grooves 13 are produced, namely two at the top and one at the bottom, and later on series of holes are produced which are adapted to generate a certain air circulation through the housing portion and past the two beads 3.

The embodiment according to FIG. 1 is adapted for heating by means of a gaseous or liquid medium or possibly a similar cooling medium, and the baseboard is built up of a plurality of sections of profile rails of the type shown in FIG. 1 by suitable tube coupling means which are adapted to connect the channels 4 in adjacent apparatus sections with each other.

In the embodiment according to FIGS. 3 and 4 the housing portion 1 is formed with two longitudinally extending grooves 14 on the surfaces of the beads 3 facing each other, and in said grooves plate-shaped portions 15 on a profile rail 16 having a ladder-shaped cross-section are received, in said profile rail four spaces 17 for electric cables 18 being provided, some of which may be connected to sleeve sockets 19 on the outer side of the body plate 2. The cables 18 which may be connected to the mains or a source of low current, serve to deliver current to domestic apparatuses, such as lamps, television sets etc., and the housing portion 1 serves as carrying means and screen for the said electric cables and for carrying outlets 19 and switches for the current.

By the embodiment according to FIG. 6 the grooves 14 are used for receiving a plate-shaped electric heating element 20 which, as shown in FIG. 5, extends in zig-zag through the longitudinal direction of the housing and which serves to supplement or substitute the heat effect from the heating medium channels 4. On the heating element connecting means 21 are provided adapted to connect heating elements in two adjacent apparatus sections.

The embodiment according to FIG. 2 is adapted for heating partly by a gaseous or liquid heating medium in the channels 4 and partly by an electric heating element 20 carried by the housing portion 1 in the same way as shown in FIG. 6. Further the apparatus is adapted to carry and screen electric cables 18 in the same ways as in the embodiment according to FIG. 4, and the cables are carried by a profile rail 22 having a ladder-shaped cross-section, the edges of said rail engaging the inner surfaces of the beads 3.

I claim:

1. A heating apparatus of the type which is adapted to be mounted as a baseboard along the walls of the room which is to be heated, said apparatus comprising a housing portion consisting of a profiled metal rail having a body plate providing a heat-radiating surface which is vertical in use, said rail being formed with upper and lower integral, inwardly facing, longitudinally extending hollow beads having hollow spaces which constitute supply and return channels for the gaseous or liquid medium and said housing further including internal carrying means for longitudinally extending electric cables, said carrying means comprising a profile rail having a ladder-shaped cross-section the free ends of which engage the opposite, arched surfaces of the beads.

2. A heating apparatus of the type which is adapted to be mounted as a baseboard along the walls of the room which is to be heated, said apparatus comprising a housing portion consisting of a profiled metal rail having a body plate providing a heat-radiating surface which is vertical in use, said rail being formed with upper and lower integral, inwardly facing, longitudinally extending hollow beads which constitute supply and return channels for the gaseous or liquid medium and said housing further including internal carrying means for longitudinally extending electric cables characterized in that the housing portion further is formed with means for mounting at least one socket for connecting the cables with a plug on a wire leading to a consumption unit.

3. An apparatus according to claim 2, characterised in that the housing portion is adapted to be carried by another housing portion which has a body plate adapted to be mounted on the room wall, for instance by means of screws, and upper and lower elastic flanges which are shaped to engage the beads on the first housing portion by snap action.

4. An apparatus according to claim 2 wherein said carrying means comprises a hollow member fitting between said beads and having projecting ends engaging in retaining formations associated with said beads.

* * * * *